United States Patent [19]

St. Clair

[11] Patent Number: 5,175,529
[45] Date of Patent: Dec. 29, 1992

[54] FAST EVENT DETECTOR

[75] Inventor: Raymond E. St. Clair, Huntsville, Ala.

[73] Assignees: John C. Garvin, Jr.; Harold W. Hilton, both of North Huntsville, Ala.

[21] Appl. No.: 711,961

[22] Filed: Jun. 7, 1991

[51] Int. Cl.$^5$ .............................................. B60Q 1/00
[52] U.S. Cl. .................................. 340/425.5; 340/435; 340/436; 340/555; 340/938; 340/903; 340/939; 340/942; 250/336.1; 250/214 B; 250/200; 180/271
[58] Field of Search ...................... 340/425.5, 435, 436, 340/437, 438, 555, 554, 556, 938, 903, 939, 942; 180/271, 274; 250/336.1, 342, 200, 214 B

[56] References Cited

U.S. PATENT DOCUMENTS

| | | | |
|---|---|---|---|
| 4,143,264 | 3/1979 | Gilbert et al. | 250/210 |
| 4,274,091 | 6/1981 | Decker | 340/906 |
| 4,694,296 | 9/1987 | Sasaki et al. | 340/903 |
| 4,825,211 | 4/1989 | Park | 340/903 |

Primary Examiner—Donnie L. Crosland
Attorney, Agent, or Firm—John C. Garvin, Jr.; Harold W. Hilton

[57] ABSTRACT

A fast acting sensing circuit for use in a warning system to indicate relative movement between an object and a sensor when the movement exceeds a predetermined rate of speed. The circuit only provides an output if the rate of speed exceeds the predetermined level.

14 Claims, 5 Drawing Sheets

FAST EVENT DETECTOR

BACKGROUND OF THE INVENTION

FIELD OF THE INVENTION

This invention is directed to a warning system including a sensing circuit for sensing movement between an object and a fast event detection circuit which is disposed for actuation by an output signal from the sensing circuit to provide an output signal for actuation of a warning device when the relative movement between the object and the sensing circuit exceeds a predetermined rate of speed.

The warning system of the present invention is particularly adaptable for use in vehicles and specifically transport vehicles which are driven for long periods of time over great distances.

Often a driver of a vehicle becomes fatigued and sleepy after being on the road for many hours and tends to lose concentration on operating his vehicle. Such loss of concentration could result in very serious injury to himself or others if the vehicle is left to wander across the road divider or edge line markers which are typically painted along the center and/or the edge of the roadway. Also some roads may have lines or markers painted thereon at a position preceding a dangerous point or area on the road.

Apparatus of the present invention includes a sensing circuit and a fast response circuit which provides an electrical signal responsive to a vehicle crossing such lines or markers. The electrical signal may be used to activate a warning device such as buzzer/horn/and or light to warn the operator of the vehicle of possible impending danger resulting from the vehicle inadvertently wandering across such lines or markers.

A feature of the apparatus of the present invention is the provision of a fast event detection circuit in combination with an optical sensor circuit which forms an optical detector system which assures that the warning system is rapidly activated at vehicle speeds above a predetermined rate but is not responsive at vehicle speeds below a predetermined rate. This assures that an output signal is not generated if the movement between the apparatus and the object is below a predetermined rate of speed, thereby permitting the vehicle to pass over painted lines, etc., in "downtown" areas without the warning system being activated.

Another feature of the present invention is that the circuit of the present invention may be particularly useful in industrial applications to warn of excessive speed of components or systems which could adversely effect the output of the operations of a production plant, laboratory, office, etc.

SUMMARY OF THE INVENTION

It is an object of the present invention, therefore, to provide apparatus, including a sensor circuit, for detecting relative movement between an object and the sensor and a fast response circuit which is responsive to the sensor circuit to rapidly provide an output signal.

It is a further object of the present invention to provide such apparatus which is non responsive unless such relative movement is above a predetermined rate of speed.

It is yet another object of the present invention to provide such apparatus with means for generating an output signal responsive to said relative movement above the predetermined rate of speed.

It is still another object of the present invention to provide a warning device for actuation by said output signal when the relative movement exceeds the predetermined rate of speed.

DESCRIPTION OF THE PREFERRED EMBODIMENT

Figure 1:
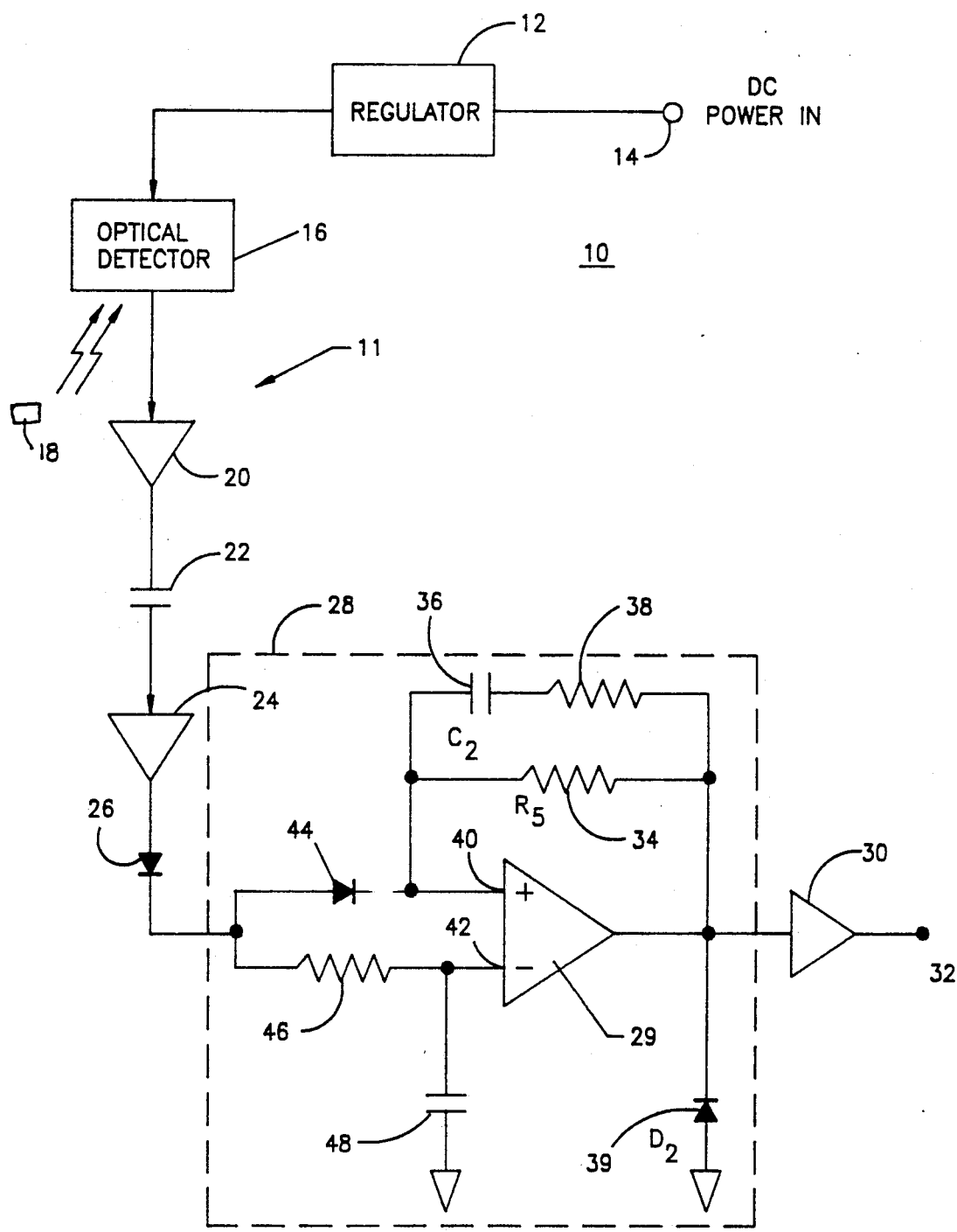
FIG. 1 is a schematic diagram of the optical detector system of present invention, including a fast event detector circuit in combination with an optical detector circuit.

As seen in FIG. 1, an optical detector system 10 is shown to include an optical sensor circuit 11 and a fast event detector circuit 28. The optical sensor circuit 11 includes a voltage regulator 12 which precisely regulates an input voltage from a power source 14 to an optical detector 16 which is disposed for actuation response to relative movement between optical detector 16 and an object 18. The varying output from optical sensor 16 is directed to an amplifier 20. The output of amplifier 20 is AC coupled by AC coupling capacitor 22 where the low frequency and DC components are removed. This AC signal is then amplified by amplifier 24 and the signal from amplifier 24 is then rectified by diode 26 and smoothed by capacitor 27 and now becomes a varying DC signal.

This varying DC signal is fed to fast event detector comparator circuit 28 that provides an output signal that is dependent on the changing state of an amplifier 29 whose output is fed to an output amplifier 30 which provides an output signal at point 32. A feedback resistor 34 and a capacitor 36 control hysteresis. A diode 39 controls the feedback voltage level at the input junction node and resistor 34. A resistor 38 may be provided in series with capacitor 36 to limit the energy that the capacitor 36 sees.

The fast event circuit 28 is a comparator circuit and its output state is dependent on comparison of the voltage levels of the noninverting and inverting input 40 and 42 of amplifier 29. By biasing one input of the comparator 29 (amplifier) at a slightly lower voltage than the other input with a voltage dropping diode 44 and controlling the rate of change of the other input with an RC circuit comprised of a resistor 46 and capacitor 48, the output state of the comparator (amplifier) will change only if the input signals change at a fast enough rate.

The input signals to the comparator is, of course, received from the sensor circuit 11. Thus, if the relative movement between object 18 and optical detector 16 is not fast enough to satisfy the parameters built into the fast event detector circuit, amplifier 29 will not change state and no output change will be initiated.

Figure 2:
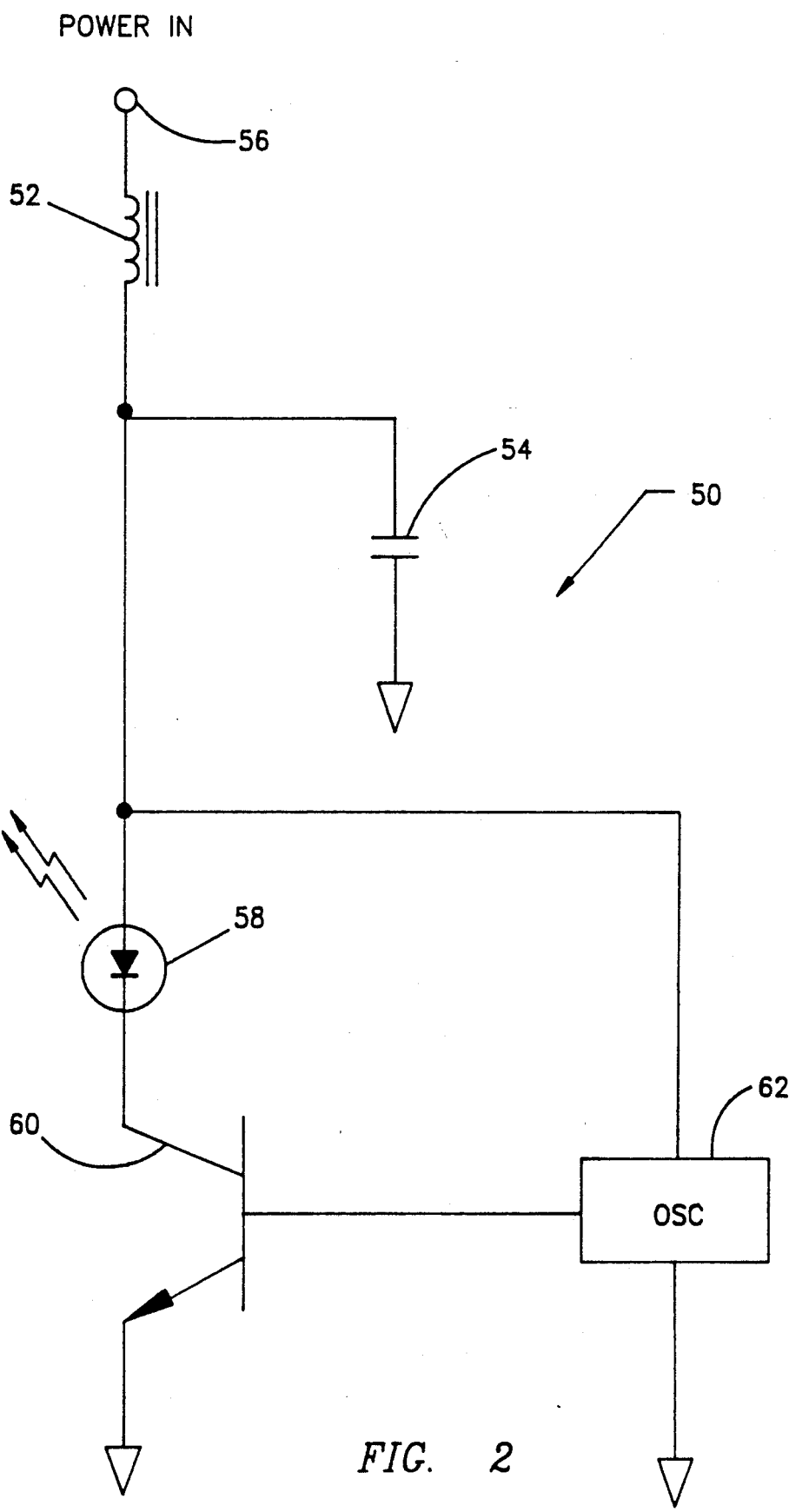
FIG. 2 is a schematic diagram of an optical transmitter for use with the detector system of FIG. 1.

As seen in FIG. 2, an optical transmitter 50 is shown which may be used to provide an input signal to detector system 10. The transmitter circuit is shown to have an input filter circuit including an inductor 52 and capacitor 54 connected to a source of power 56. The output from inductor 52 is passed on to an optical diode 58 for energization thereof. The diode 58 is connected to a power transistor 60 and an oscillator 62 is connected across the base of transistor 60 and optical diode 58.

Figure 3:
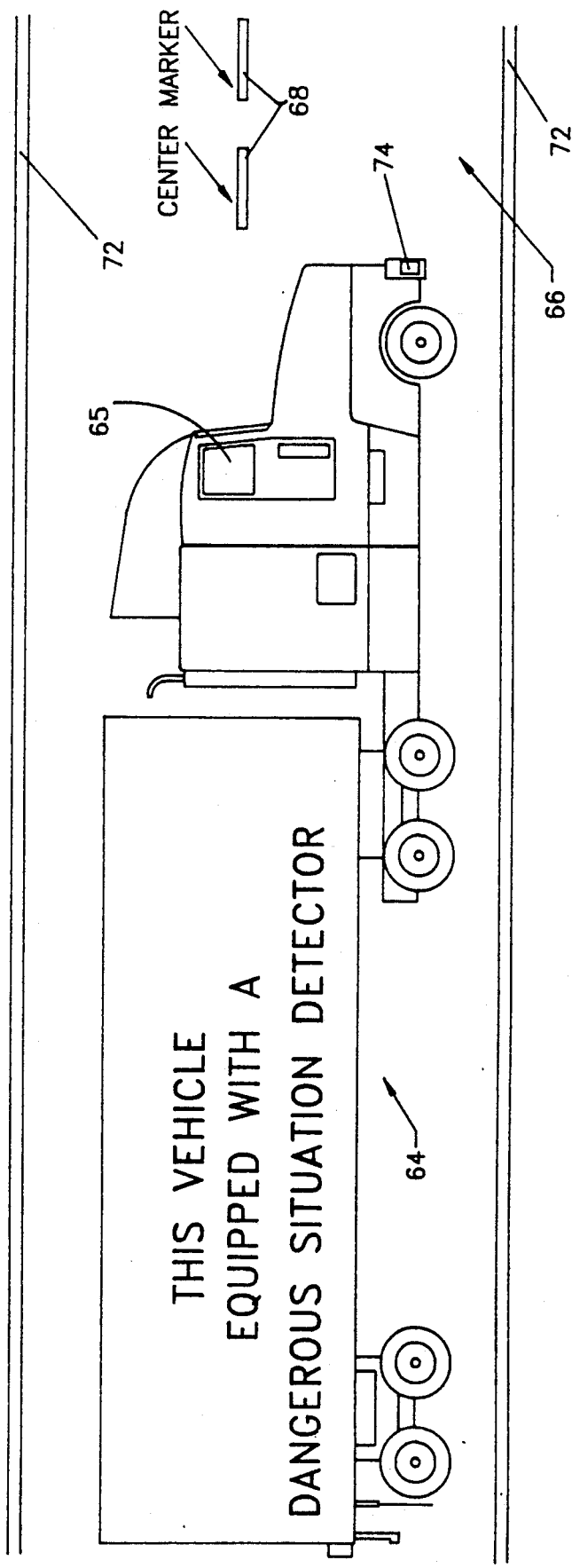
FIG. 3 is a pictorial view of a vehicle having the detector/transmitter device of FIGS. 1 and 2 mounted therein for generating a warning signal to warn the operator of the vehicle of impending danger.

One preferred application of the above described circuits is shown in FIG. 3. The circuits are incorporated in a vehicle to warn the driver when the vehicle starts across a center line in the middle of the roadway or across side lines typically found along highways and rural roads. Power for the circuits may be received from the vehicle operation battery or from another battery carried by the vehicle.

Figure 4:
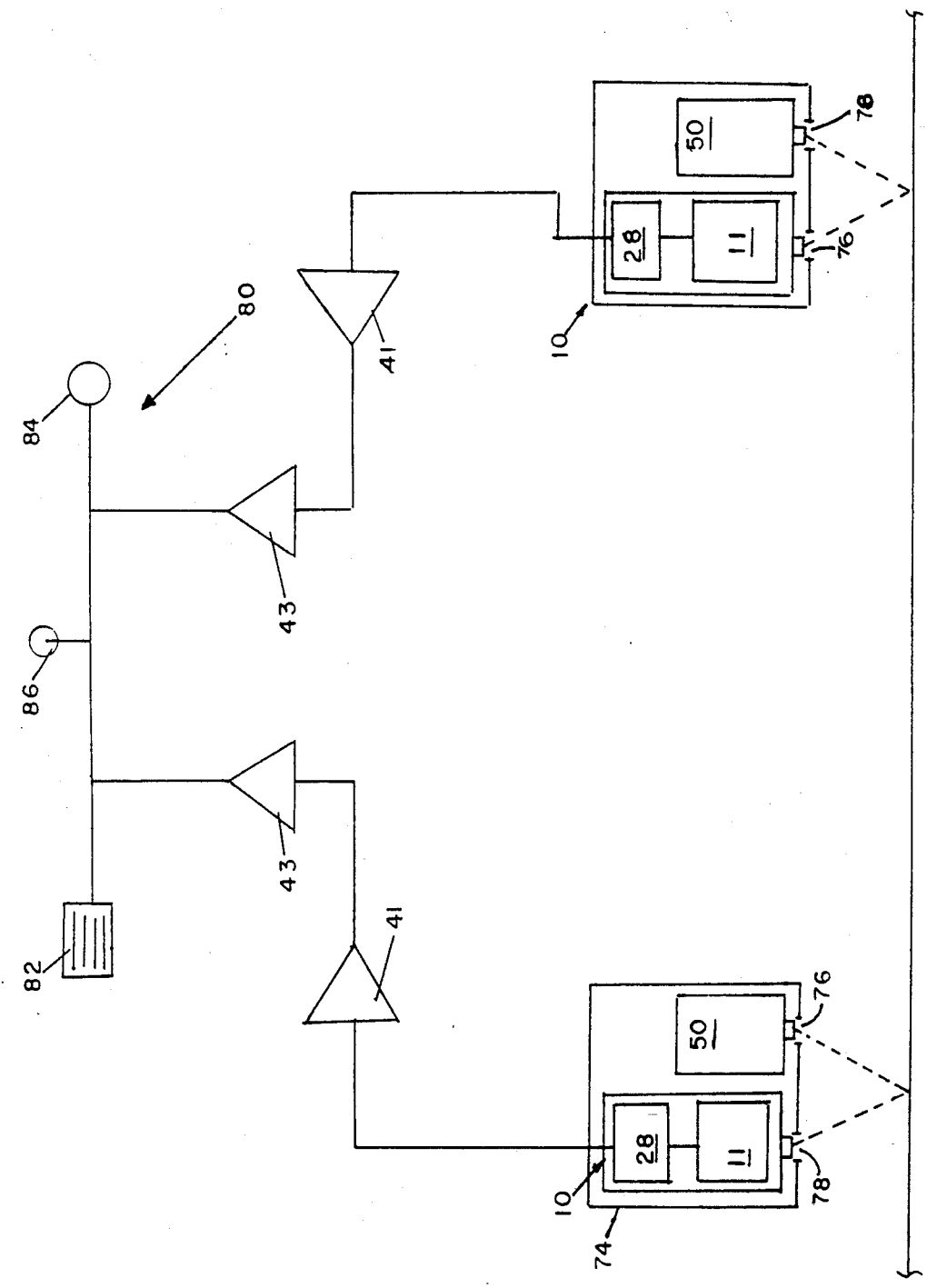
FIG. 4 is a diagrammatic view of the warning system of FIG. 3.

As seen in FIG. 3 a vehicle 64 includes a cab 65. The vehicle is shown on a roadway 66 having a center line 68 and side lines 70 and 72. Detector system 10 and transmitter 50 are mounted in a housing 74 which is secured adjacent to the forward most portion of vehicle 64. As more clearly seen in FIG. 4, which is a diagrammatic illustration, transmitter 50 and optical detector system 10 is shown mounted in housing 74 which may be secured at the forward portion (left front fender and right front fender) of the vehicle. Housing 74 includes an opening 76 to transmit the output from transmitter 50 to the road surface. A second opening 78 is provided in the housing 74 to direct the returned signal from the roadway onto the optical detector 16 of optical system circuit 10.

It is to be understood that while the above described circuits are found to be particularly adaptable to use in vehicles as a warning system, the circuits may be used for other purposes than as described in relation to vehicle warning system. Fast event detector circuit 28 may, for example, be used in industrial applications wherein speeds of rotatory or linear moving objects are required to be monitored. In such applications, the stimulus for the fast event detector circuit may be obtained by illuminating the object by the transmitter a described above or by any of many other methods.

It is to be further understood that when the above described circuits are used in a warning system of a vehicle or the like, the power sources 14 and 56 may be the operating battery of the vehicle or other batteries carried in the vehicle. When the circuits are used in other environments such as industrial plant, etc., other sources of power may be utilized.

The outputs from each optical detector circuit 11 is passed onto an associated fast event detector circuit 28 of the optical system 10 of FIG. 1 where the outputs are then sent to input buffer amplifiers 41 and then to amplifiers 43 which are directed to a warning system 80 which may include a buzzer 82 and/or light 84. An output receptacle 86 may also be connected to the output of amplifiers 43. Of course, the output of the optical detector circuit is caused to change as the vehicle crosses over the marker (center or side lines) on the road and such a change results in change in the input to the fast event detector circuit 28. An important feature of the above described circuit is that it may be operated on surfaces that gradually change contrast thus preventing false alarms from irritating the operator of the vehicle.

Figure 5:
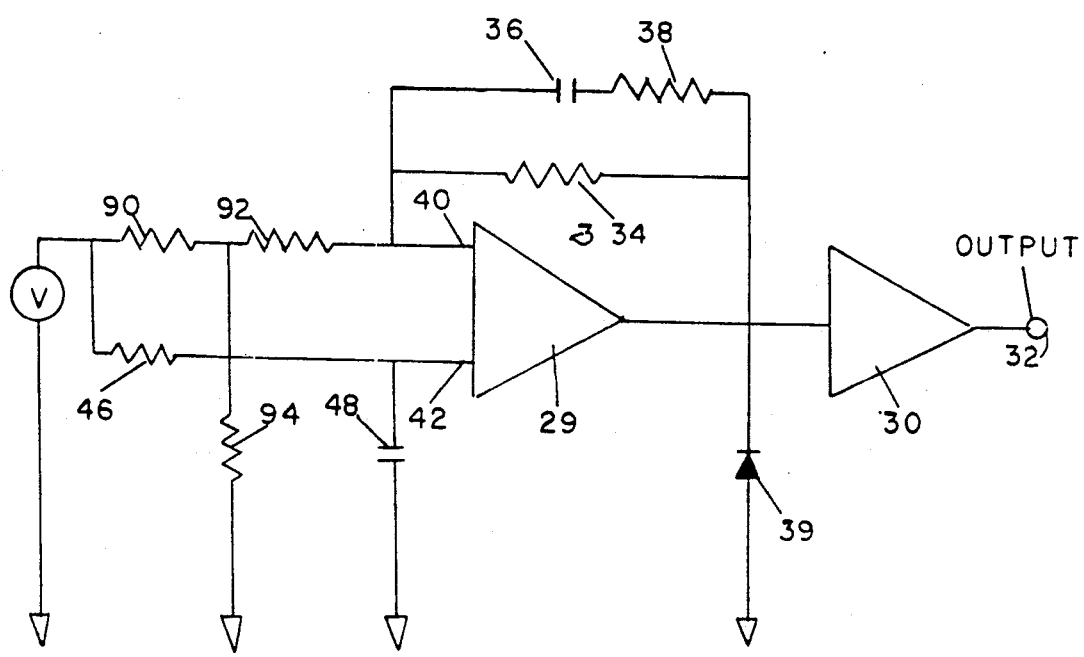
FIG. 5 is a schematic view of an alternate embodiment of the fast event detector circuit of the present invention.

FIG. 5 illustrates an alternate embodiment of the fast event detector circuit 28 of FIG. 1 wherein like numerals refer to like parts. In this embodiment, all of the components of the embodiment of FIG. 1 remains except that the diode 44 has been replaced by a pair of series connected resistors 90 and 92 and with a third resistor 94 which is connected between resistors 90 and 92 and ground.

I claim:

1. A fast event detector system for use in a vehicle having means to detect and signal when a road line such as a lane marker is being crossed, comprising;
   a light transmission device mounted on at least one side of the forward portion of said vehicle;
   photoresponsive means mounted adjacent said light transmission device for receiving reflected light from a lane marker on the pavement of a road;
   fast event detector circuit means electrically connected to said photoresponsive means for receiving electrical signals therefrom which indicates the detection of said lane marker; said fast event detection circuit including a comparator having inverting and non-inverting inputs electrically connected to said photoresponsive means to receive said electricals therefrom, a first voltage dropping diode connected between said non-inverting input and said photoresponsive means for controlling the voltage level of said electrical signals from said photoresponsive means to said non-inverting input, a RC circuit disposed between said photoresponsive means and said inverting input of said comparator for biasing said inverting input of said comparator, whereby said inputs of said comparator are controlled so that said comparator is active only if the rate of speed of said vehicle relative to said lane markers exceeds a predetermined level; and
   warning means carried by said vehicle and electrically connected to the output of said comparator to provide warning signals when said vehicle approaches and lane markers above said predetermined speed.

2. A system as set forth in claim 1 wherein said second means for controlling said second input of said comparator means includes an RC circuit disposed between said second input of said comparator means and said detection means for biasing said second input of said first comparator means.

3. A system as set forth in claim 2 wherein said fast event detector means includes a feedback resistor and a capacitor connected in parallel relation across said input and output of said comparator means.

4. A system as set for the in claim 3 wherein said fast event detector means includes a resistor connected in series with said capacitor to control the energy seen by said capacitor 5. A system as set forth in claim 4 wherein said fast event detector means includes a voltage dropping diode connected at the input junction mode and said feedback resistor to control voltage feedback.

6. A system as set forth in claim 5 including an output amplifier having an input and output, said input connected to said output of said comparator means of said fast event detector means.

7. A system as set forth in claim 6 including support means for supporting said detector system adjacent said relatively moveable object.

8. A system as set forth in claim 7 wherein support means is a vehicle.

9. A system as set forth in claim 8 wherein said support means includes a housing for housing and supporting said sensor means adjacent the front of said vehicle on opposite thereof.

10. A system as set forth in claim 9 including second support means comprising a second housing for supporting said fast event detector means in the cab of said vehicle.

11. A system as set forth in claim 10 including warning means secured in said cab of said vehicle and connected to said output of said output amplifier to provide a warning signal to the operator of said vehicle responsive to said sensor means being triggered in response to movement of said vehicle across a divider line or marker on a roadway being traversed by said vehicle.

12. A system as set forth in claim 11 where in said warning means is a noise generator.

13. A system as set forth in claim 11 wherein said warning means is a light.

14. A fast event detector system comprising:

sensor means for detecting a relatively moveable object and for generating an electrical signal responsive to the detection;

fast event detector means cooperating with said sensor means for receiving said electrical signal as an input and for providing an output signal only if said relative movement between said sensor means and said object is above a predetermined rate of speed, said fast event detector means including a comparator means having first and second inputs for receiving said electrical signal from said sensor means, and first and second means for controlling said first and second inputs so that said comparator means is active only if the difference between said first and second inputs reaches a predetermined value, said difference being proportional to the speed of said object relative to said sensor means, said first means for controlling said first input of said comparator means including a first voltage dropping diode disposed between said first input of said comparator means and said detection means for controlling the voltage level of said signal from said detection means to said first input of said comparator means.

* * * * *